Patented June 9, 1942

2,286,062

UNITED STATES PATENT OFFICE 2,286,062

PROCESS FOR COPOLYMERIZING MALEIC ANHYDRIDE AND POLYMERIZABLE VINYL COMPOUNDS

Fred E. Condo and Charles J. Krister, Cleveland, Ohio, and William E. Lundquist, Wilmington, Del., assignors to E. I. du Pont de Nemours & Company, Wilmington, Del., a corporation of Delaware No Drawing. Application June 1, 1940, Serial No. 338,372

8 Claims. (Cl. 260—32)

This invention relates to polymerization processes and more particularly to processes in which maleic anhydride is co-polymerized, in a non-reactive, water-immiscible solvent, with a compound which contains a single

group and which is capable of being polymerized but contains no substantial amount of its polymer, and the co-polymer is digested in an aqueous solution of a base in the presence of the water-immiscible solvent. Still more specifically, the invention relates to polymerization processes of the above-described type in which the polymerizable compound containing the

group is styrene.

When it is attempted to co-polymerize styrene and maleic anhydride in the absence of any diluent, the polymerization, once initiated, proceeds with considerable evolution of heat. Such mass polymerizations proceed very rapidly and may become quite violent if large quantities of the reactants are present. Very little control of the molecular weights of the polymers so prepared is possible. The polymeric molecules formed in this way are usually too large to be readily water soluble, and hence are inapplicable for uses in which water solubility is a desideratum.

It has been proposed to avoid these difficulties in the polymerization of styrene with maleic anhydride by dissolving one or both of the reactants in a suitable solvent such as xylene and carrying out the polymerization in such solution. While the rate of polymerization may thus be controlled, other difficulties equally vexatious from a commercial standpoint are encountered. The polymer is obtained as a light flaky precipitate dispersed in the xylene or other solvent. A partial separation of the precipitate from the solvent may be effected by filtration, but since the precipitated polymer exists as a solvated compound in such solvents as xylene, a complete separation by means of filtration can not be accomplished. By prolonged drying at elevated temperatures it is possible to break up these solvated compounds, evaporate the solvent, and thus obtain the co-polymer unassociated with the solvent, but after such drying the polymer is in the form of a very light fluffy powder which is extremely difficult to handle. Special, expensive precautions against dust losses must be taken when working with the dried material. Moreover, unless the drying operation is extremely thorough and complete, traces of the solvent remain in the product and adversely affect its rate of dissolution in water.

These difficulties which have been observed in the co-polymerization of maleic anhydride with styrene are similarly encountered when other polymerizable materials containing a

group are co-polymerized with maleic anhydride instead of, or together with, the styrene.

Now we have found that maleic anhydride can be co-polymerized with polymerizable compounds containing a single

group to produce co-polymers having molecular weights low enough to give good water solubility and a physical form in which they are easily handled, by processes in which maleic anhydride is co-polymerized in a non-reactive water-immiscible solvent with a polymerizable compound containing a single

group, and the co-polymer, in the presence of the water-immiscible solvent, is digested in an aqueous solution of a base to effect solution of the co-polymer in an aqueous medium. The aqueous solution so formed may then be separated from the water-immiscible solvent. Preferably, this digestion is carried out under conditions such that initially the co-polymer is hydrolyzed and neutralized only sufficiently to cause it to dissolve in the aqueous medium. If desired, the co-polymers so obtained may be further hydrolyzed and neutralized. After separation of the water-immiscible solvent has been effected from either the partially or completely hydrolyzed and neutralized aqueous solutions, water may be removed from the aqueous solutions if desired to obtain the product in solid form.

By carrying out the polymerization of styrene and maleic anhydride in the presence of a solvent, the rate of the polymerization can be controlled and the danger of the reaction becoming too violent, even when large quantities of reactants are employed, is avoided. Despite the use of a solvent, however, the product is obtained either as a water solution or in a form in which it is readily water soluble.

In order that the processes of our invention may be better understood, they will be described with reference to a specific example.

*Example*

A styrene-maleic anhydride co-polymer was prepared by placing 154 parts by weight of xylene in a suitable tank, adding 10.8 parts of styrene and 10.2 parts of maleic anhydride, heating the mixture to 100° C. with agitation and adding 0.42 part of benzoyl peroxide as a catalyst. The batch was stirred for 1.5 hours, after which precipitation of the solid co-polymer was substantially complete. The reaction mixture was then cooled to 90° C. and there was added 126 parts of water and 0.88 part of 95 per cent sodium hydroxide. This mixture was digested for three hours at 92° C. with slow agitation. The mixture was then allowed to stand for eight hours. During this time the mixture separated into two layers, an upper layer of xylene and a lower aqueous layer containing the polymer. The lower layer was drained off to another tank. To this solution was then added 5.4 parts by weight of 50 per cent sodium hydroxide solution, and the mixture was digested for an additional six hours at 85–95° C., the pH of the solution after this period being 5.2. The solution thus obtained was dried to a light, easily handled solid consisting of the partial sodium salt of the hydrolyzed co-polymer of styrene and maleic anhydride.

In the foregoing example, we have described our invention with relation to a certain specific embodiment thereof, but the particular embodiment shown is not to be construed as limiting the invention. Those skilled in the art will recognize that our invention has a wide range of applicability and that numerous variations and modifications can be made in the particular conditions already described.

The polymerizable compound containing a single

group is not limited to the styrene shown in the example. As compounds capable of being polymerized and containing a single

group there may be used, for instance, vinyl esters, vinyl ethers, vinyl halides, acrylic acid and its amide and esters, acrylo- and methacrylonitrile or cinnamic acid esters.

The solvent employed also is not limited to the xylene shown in the example, but may be any solvent capable of dissolving the polymerizable compound containing a

group and the maleic anhydride without reacting with them and which is immiscible with water, is not decomposed by digestion in the presence of water and a base, and in which the co-polymer to be produced is insoluble. We have found that aromatic hydrocarbon solvents such as benzene, ethylbenzene, toluene, and the xylene of the foregoing example are particularly well suited to the necessary conditions.

When the polymerizable compound containing a

group is styrene, the styrene and maleic anhydride are preferably used in approximately stoichiometric proportion, that is one mol of styrene per mol of maleic anhydride. We have found that the styrene used should preferably be completely in the monomeric form since the presence of any polystyrene prevents or retards the separation of the solvent from the aqueous layer in the subsequent digestion step. In order to retard the formation of polystyrene, we may prefer to add to the monomeric styrene a small amount of a peroxidation inhibitor and to carry out the co-polymerization in the presence of such inhibitor. Peroxidation inhibitors are well known, the art being familiar with them on account of their use in such products as rubber and gasoline. More specifically, we prefer to use small amounts, say up to about 5 per cent on the weight of the styrene, of a peroxidation inhibitor, such as, for example, tertiary butyl catechol, hydroquinone, or elemental sulfur, to prevent the formation of polystyrene.

The co-polymerization of a polymerizable compound containing a

group and maleic anhydride in a suitable solvent may be initiated by heating in the presence of a peroxide. Instead of the benzoyl peroxide shown in the example, other organic peroxides such as acetyl peroxide, ascaridole, dibutyryl peroxide, lauroyl peroxide, or succinyl peroxide may suitably be employed.

The temperature at which the polymerization is carried out may be considerably varied, and in fact the rate of the polymerization may be controlled by properly controlling the temperature, higher temperatures causing higher polymerization rates and forming lower molecular weight polymers.

The time permitted for the polymerization should be sufficient to allow complete reaction of the styrene and maleic anhydride to take place. We have found that under most conditions the reaction period of one and one-half hours as used in the foregoing example is adequate to permit the completion of the reaction, but longer or shorter periods may under some circumstances be used.

For hydrolyzing and neutralizing the co-polymer formed by solution polymerization, water and any suitable base may be employed provided the co-polymer salt of the base is water soluble. Bases of the alkali metals form co-polymer salts of excellent solubility. In particular, we prefer to use potassium- or sodium-containing bases such as potassium carbonate, potassium hydroxide, sodium carbonate, or the sodium hydroxide of the foregoing example. The total amount of base employed for the hydrolysis and neutralization preferably should be somewhat less than the stoichiometric equivalent calculated to be required to neutralize the hydrolyzed co-polymer completely to the corresponding salt. We prefer to use a total amount of base such that the final product produced when dissolved in water to form a 25 per cent solution has a pH from 4.8 to 5.7.

The amount of base used in the digestion step in the presence of a solvent should preferably be only a fraction of the total amount required to give an ultimate product having a pH of 4.8 to 5.7 as a 25 per cent aqueous solution. That is, the amount of base should be sufficient to promote rapid hydrolysis of the co-polymer and effect transfer of the polymer to the aqueous constituent but insufficient to cause a substantial rise in the pH of the aqueous solution. We prefer to employ during this digestion from about one-eighth to about one-third of the total amount of base ultimately to be used, since if more than this amount is initially used the rate of separation of the aqueous and solvent layers is retarded.

Following this digestion step the solvent layer and the aqueous layer containing the co-polymer may readily be separated by gravitational methods as employed in Example 1 or may suitably be separated by other means such as centrifuging with which the art is already familiar.

The time employed in the digestion step may be widely varied. The time allowed preferably should be sufficient to permit a degree of hydrolysis to take place which will permit the co-polymer to be extracted from the non-aqueous phase into the aqueous phase. In practical operation it has been found convenient to extend the time of digestion considerably beyond this indicated minimum, and thus to secure substantially complete hydrolysis of the co-polymer during this digestion. The hydrolysis can be accelerated by heating the mixture and agitating it, as shown in the foregoing example.

After the co-polymer has been extracted and separated from the water-immiscible solvent following the first digestion step, the polymer, if only partially hydrolyzed and neutralized at this point, may be further neutralized and hydrolysis may be completed by additional digestion with further amounts of base. During this further digestion it will ordinarily be preferred to allow sufficient time to permit substantially complete hydrolysis.

In the commercial operation of the processes of our invention we have found it expedient to recover and re-use the solvent employed as a diluent in the co-polymerization step. Before such re-use, however, it is desirable that the peroxide present in the solvent be destroyed. This destruction of peroxide may readily be accomplished by adding to the solvent a small amount of a readily oxidizable substance such as formic acid.

While we have shown certain specific processes in the foregoing disclosure, it will be understood that one skilled in the art may readily employ numerous processes without departing from the spirit of this invention.

We claim:

1. In a process for producing co-polymers of maleic anhydride and polymerizable compounds containing a single

group, which co-polymers are at least partially hydrolyzed and at least partially neutralized, the steps comprising co-polymerizing maleic anhydride in a non-reactive, water-immiscible solvent with a compound which contains a

group and which is capable of being polymerized but contains no substantial amount of its polymer, and digesting the co-polymer so formed in an aqueous solution of an inorganic, alkali-metal base in the presence of the water-immiscible solvent, the amount of base being sufficient to promote rapid hydrolysis of the co-polymer and effect transfer of the polymer to the aqueous solution but insufficient to cause a substantial rise in the pH of the aqueous solution.

2. In a process for producing co-polymers of maleic anhydride and polymerizable compounds containing a single

group, which co-polymers are at least partially hydrolyzed and at least partially neutralized, the steps comprising co-polymerizing maleic anhydride in a non-reactive, water-immiscible solvent with a compound which contains a

group and which is capable of being polymerized but contains no substantial amount of its polymer, digesting the co-polymer so formed in an aqueous solution of an inorganic, alkali-metal base in the presence of the water-immiscible solvent until sufficient hydrolysis and neutralization of the co-polymer has been effected to cause it to go into aqueous solution, the amount of base being sufficient to promote rapid hydrolysis of the co-polymer and effect transfer of the polymer to the aqueous solution but insufficient to cause a substantial rise in the pH of the aqueous solution, and separating from the water-immiscible solvent this aqueous solution of at least partially hydrolyzed and at least partially neutralized co-polymer.

3. In a process for producing co-polymers of maleic anhydride and styrene which are at least partially hydrolyzed and at least partially neutralized, the steps comprising copolymerizing maleic anhydride in a non-reactive, water-immiscible solvent with styrene substantially free of polystyrene, and digesting the co-polymer so formed in an aqueous solution of an inorganic, alkali-metal base in the presence of the water-immiscible solvent, the amount of base being sufficient to promote rapid hydrolysis of the co-polymer and effect transfer of the polymer to the aqueous solution but insufficient to cause a substantial rise in the pH of the aqueous solution.

4. In a process for producing co-polymers of styrene and maleic anhydride which are at least partially hydrolyzed and at least partially neutralized, the steps comprising co-polymerizing maleic anhydride in a non-reactive, water-immiscible solvent with styrene substantially free of polystyrene, digesting the co-polymer so formed in an aqueous solution of an inorganic, alkali-metal base until sufficient hydrolysis and neutralization of the co-polymer has been effected to cause it to go into aqueous solution, the amount of base being sufficient to promote rapid hydrolysis of the co-polymer and effect transfer of the polymer to the aqueous solution but insufficient to cause a substantial rise in the pH of the aqueous solution and separating from the water-immiscible solvent this aqueous solution of at least partially hydrolyzed and at least partially neutralized co-polymer.

5. In a process for producing co-polymers of styrene and maleic anhydride which are at least partially hydrolyzed and at least partially neutralized, the steps comprising co-polymerizing maleic anhydride in a non-reactive, water-immiscible solvent with styrene substantially free of polystyrene in the presence of an organic peroxide catalyst and a peroxidation inhibitor, and digesting the co-polymer so formed in an aqueous solution of an inorganic, alkali-metal base in the presence of the water-immiscible solvent, the amount of base being sufficient to promote rapid hydrolysis of the co-polymer and effect transfer of the polymer to the aqueous solution but insufficient to cause a substantial rise in the pH of the aqueous solution.

6. In a process for producing co-polymers of styrene and maleic anhydride which are at least partially hydrolyzed and at least partially neutralized, the steps comprising co-polymerizing maleic anhydride in xylene solution with styrene substantially free of polystyrene and digesting the co-polymer so formed in an aqueous sodium hydroxide solution in the presence of the xylene, the amount of sodium hydroxide being sufficient to promote rapid hydrolysis of the co-polymer and effect transfer of the polymer to the aqueous solution but insufficient to cause a substantial rise in the pH of the aqueous solution.

7. In a process for producing partially hydrolyzed and partially neutralized co-polymers of styrene and maleic anhydride, the steps comprising co-polymerizing maleic anhydride in xylene solution with styrene substantially free of polystyrene, digesting the co-polymer so formed in an aqueous sodium hydroxide solution in the presence of the xylene, the amount of sodium hydroxide being such, relative to the amount of co-polymer and water, that it is equal to from about one-eighth to about one-third of the total amount required to produce a pH of from 4.8 to 5.7 in a twenty-five per cent solution of the hydrolyzed co-polymer, whereby the co-polymer is caused to dissolve in the aqueous solution, and separating this aqueous solution from the xylene.

8. In a process for producing co-polymers of styrene and maleic anhydride which are at least partially hydrolyzed and at least partially neutralized, the steps comprising co-polymerizing maleic anhydride in xylene solution with styrene substantially free of polystyrene in the presence of benzoyl peroxide as a catalyst and tertiary butyl catechol as an inhibitor, digesting the co-polymer so formed in an aqueous sodium hydroxide solution in the presence of the xylene, the amount of sodium hydroxide being such, relative to the amount of co-polymer and water, that it is equal to from about one-eighth to about one-third of the total amount required to produce a pH of from 4.8 to 5.7 in a twenty-five per cent solution of the hydrolyzed co-polymer, whereby the co-polymer is caused to dissolve in the aqueous solution, separating this aqueous solution from the xylene, and further neutralizing the aqueous solution.

FRED E. CONDO.
CHARLES J. KRISTER.
WILLIAM E. LUNDQUIST.